United States Patent
Blue et al.

(10) Patent No.: US 9,198,234 B2
(45) Date of Patent: Nov. 24, 2015

(54) HYDROCARBON FLUID PIPELINE INCLUDING RF HEATING STATION AND RELATED METHOD

(75) Inventors: Mark Ernest Blue, Palm Bay, FL (US); Ronald Edward Jackson, Jr., West Melbourne, FL (US); Michael Joseph Ottomanelli, Melbourne Beach, FL (US); Donald S. George, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 908 days.

(21) Appl. No.: 13/414,228

(22) Filed: Mar. 7, 2012

(65) Prior Publication Data

US 2013/0233429 A1    Sep. 12, 2013

(51) Int. Cl.
*H05B 6/40* (2006.01)
*H05B 6/80* (2006.01)
*F16L 53/00* (2006.01)

(52) U.S. Cl.
CPC .............. *H05B 6/802* (2013.01); *F16L 53/004* (2013.01); *H05B 2214/03* (2013.01)

(58) Field of Classification Search
CPC .... F16L 53/004; H05B 6/802; H05B 2214/03
USPC ......... 219/647, 607, 611, 617, 628, 643, 635, 219/660, 675, 670, 672, 687; 138/103, 106
See application file for complete search history.

(56) References Cited

U.S. PATENT DOCUMENTS

| | | | | |
|---|---|---|---|---|
| 3,092,514 A | | 6/1963 | Tomberlin | 134/1 |
| 3,617,699 A | | 11/1971 | Othmer | 219/300 |
| 4,714,812 A | * | 12/1987 | Haagensen et al. | 219/697 |
| 5,055,180 A | | 10/1991 | Klaila | 208/402 |
| 5,935,433 A | | 8/1999 | Stefanini | 210/222 |
| 6,142,707 A | | 11/2000 | Bass et al. | 405/158 |
| 6,779,565 B1 | | 8/2004 | Fawley | 141/1 |

(Continued)

FOREIGN PATENT DOCUMENTS

| | | |
|---|---|---|
| AU | 4487789 | 5/1990 |
| GB | 896406 | 5/1962 |

(Continued)

OTHER PUBLICATIONS

Database WPI, Week 199021, Thomson Scientific, London, GB, XP002696680 & SU 1496015, Jul. 1989, pp. 1-3.

(Continued)

*Primary Examiner* — Quang Van
(74) *Attorney, Agent, or Firm* — Allen, Dyer, Doppelt, Milbrath & Gilchrist, P.A. Attorneys at Law

(57) ABSTRACT

A hydrocarbon fluid pipeline may include pipeline segments connected together in end-to-end relation between first and second spaced apart geographic locations and configured to carry hydrocarbon fluid therethrough. The hydrocarbon fluid pipeline may also include a radio frequency (RF) heating station that may include an RF source and an RF heater between adjacent pipeline segments of the plurality thereof. The RF heater may include an inner tubular dielectric coupler between the adjacent pipeline segments, and an electrically conductive outer housing surrounding the inner tubular dielectric coupler and connected to the RF source to heat the hydrocarbon fluid.

10 Claims, 6 Drawing Sheets

(56) References Cited

U.S. PATENT DOCUMENTS

| | | | |
|---|---|---|---|
| 7,891,421 B2 | 2/2011 | Kasevich | 166/247 |
| 2009/0283257 A1 | 11/2009 | Becker | 166/248 |
| 2010/0219105 A1 | 9/2010 | White et al. | 208/391 |
| 2010/0263761 A1* | 10/2010 | Niccolls et al. | 138/146 |
| 2011/0049133 A1 | 3/2011 | Przybyla | 219/647 |

FOREIGN PATENT DOCUMENTS

| | | |
|---|---|---|
| GB | 2457495 | 8/2009 |
| JP | S6365251 | 3/1988 |
| WO | 2011048349 | 4/2011 |

OTHER PUBLICATIONS

Gulf Oil and Gas, L&T to Build India's First Heated Pipeline for Crude, Feb. 21, 2008, pp. 1 of 1.

Cairn, Skin Effect Heat Management System, Feb. 2009, pp. 1-8.

Moore, Alexander F., "Active Heating System for Oil Pipeline," Statutory Invention Registration, Registration No. U.S. Pat. No. H2139 H, Published Jan. 3, 2006, 5 pgs.

\* cited by examiner

HYDROCARBON FLUID PIPELINE INCLUDING RF HEATING STATION AND RELATED METHOD

FIELD OF THE INVENTION

The present invention relates to the field of hydrocarbon fluid pipelines, and, more particularly, to hydrocarbon fluid pipeline heating and related methods.

BACKGROUND OF THE INVENTION

Transportation costs associated with a hydrocarbon fluid, for example, gasoline or other hydrocarbon resources, may account for an increased percentage of the overall fuel cost. To reduce transportation costs associated with a hydrocarbon fluid, several methods for distributing the hydrocarbon fluid in bulk have been used. For example, container or tanker ships or vehicles may be used to transport a relatively large amount of hydrocarbon fluids. Another method for transporting a hydrocarbon fluid may be a hydrocarbon fluid pipeline, for example.

One particular hydrocarbon transport pipeline is the Trans Alaska Pipeline System (TAPS). The Trans Alaska Pipeline System includes about 800 miles (1,287 km) of hydrocarbon fluid pipeline with a diameter of 48 inches (122 cm) that conveys oil from Prudhoe Bay, to Valdez, Ak. and transports primarily crude oil.

A hydrocarbon fluid pipeline in a particularly cold environment, such as, for example, Alaska, may be subject to increased operational issues that may result from heat loss. Additionally, as flow rates in a hydrocarbon fluid pipeline decrease, temperature and turbulence decreases.

Some operational issues associated with reduced flow rates or reduced temperatures may include wax precipitation and deposition that forms at temperatures below 75° F., and water drop out, which may lead to increased corrosion and increased ice formation. Other operational issues may include geotechnical issues, for example, formation of ice in buried sections of pipeline, and pipeline movement.

To address some of the above-noted operational issues, and perform maintenance on the hydrocarbon fluid pipeline, a pipeline pig may be used. A pipeline pig is a mechanical device sent through the hydrocarbon pipeline to perform a variety of maintenance functions. The most common pig is a scraper pig, which removes wax that precipitates out of the oil and collects on the walls of the hydrocarbon fluid pipeline. As noted above, the colder the hydrocarbon fluid, the more wax buildup. This buildup can cause a variety of problems, so regular "piggings" are needed to keep the pipe clear. However, at reduced flow rates, these piggings may be interrupted, have increased operational issues, or may require additional pigging operations.

Other operational issues may include decreased leak detection. Startup, shutdown, and other safety issues may also increasingly be a concern.

Reliable operation may be established for a specific desired flow rate in barrels per day (BPD). With a reduced flow rate stemming from reduced pressures and supply, it may be desirable to implement mitigation techniques.

While hydrocarbon fluids typically enter the hydrocarbon fluid pipeline from a source, i.e. reservoir, at elevated temperatures, the hydrocarbon fluid may be quickly cooled within the hydrocarbon fluid pipeline. A small number of refineries along the hydrocarbon fluid pipeline may add some heat. However, this heat may not be sufficient to reduce operational issues and reduce cost to effectively maintain the hydrocarbon fluid pipeline. Thus, it may be desirable to further heat the hydrocarbon fluid within the hydrocarbon fluid pipeline.

One approach to heating the hydrocarbon fluid pipeline may include construction of steam injection plants for conduction heating via heat exchangers. However, relatively large temperature deltas are required for conductive heating.

U.S. Patent Application Publication No. 2011/0049133 to Przybyla discloses RF heating of a dielectric fluid within a pipeline. RF power is applied to electrode plates which heat the hydrocarbon fluid passing through pipeline. Unfortunately, the electrode plates obstruct the pipeline flow, and pig operations.

U.S. Pat. No. 6,142,707 to Bass et al. discloses direct electric pipeline heating. Inner and outer conductive walls serve as a path for current flow. The thermal conduction from resistive heating of pipeline walls, however, may be inefficient.

U.S. Patent Application Publication No. 2010/0219105 to White et al., and which is assigned to the assignee of the present invention, discloses RF heating of hydrocarbon fluids in a hydrocarbon fluid pipeline. A tunable radiating antenna is wrapped around a non-conductive pipe to define a radiating element implementation.

SUMMARY OF THE INVENTION

In view of the foregoing background, it is therefore an object of the present invention to heat hydrocarbon fluid flowing through a hydrocarbon fluid pipeline.

This and other objects, features, and advantages in accordance with the present invention are provided by a hydrocarbon fluid pipeline that includes a plurality of pipeline segments connected together in end-to-end relation between first and second spaced apart geographic locations and configured to carry hydrocarbon fluid therethrough. The hydrocarbon fluid pipeline also includes a radio frequency (RF) heating station that includes an RF source, and an RF heater between adjacent pipeline segments of the plurality thereof. The RF heater includes an inner tubular dielectric coupler between the adjacent pipeline segments, and an electrically conductive outer housing surrounding the inner tubular dielectric coupler and connected to the RF source. Accordingly, hydrocarbon fluid flowing through the hydrocarbon resource pipeline may be heated, for example, to reduce operational issues associated with a reduced flow.

A method aspect is directed to a method of heating hydrocarbon fluid flowing through a hydrocarbon fluid pipeline including a plurality of pipeline segments coupled together between first and second spaced apart geographic locations. The method includes positioning an RF heater between adjacent segments of the plurality thereof. The RF heater includes an inner tubular dielectric coupler between adjacent segments of the plurality thereof, and an electrically conductive outer housing surrounding the inner tubular dielectric coupler. The method also includes supplying RF power to the RF heater via the outer housing to heat the hydrocarbon fluid flowing through the hydrocarbon pipeline.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
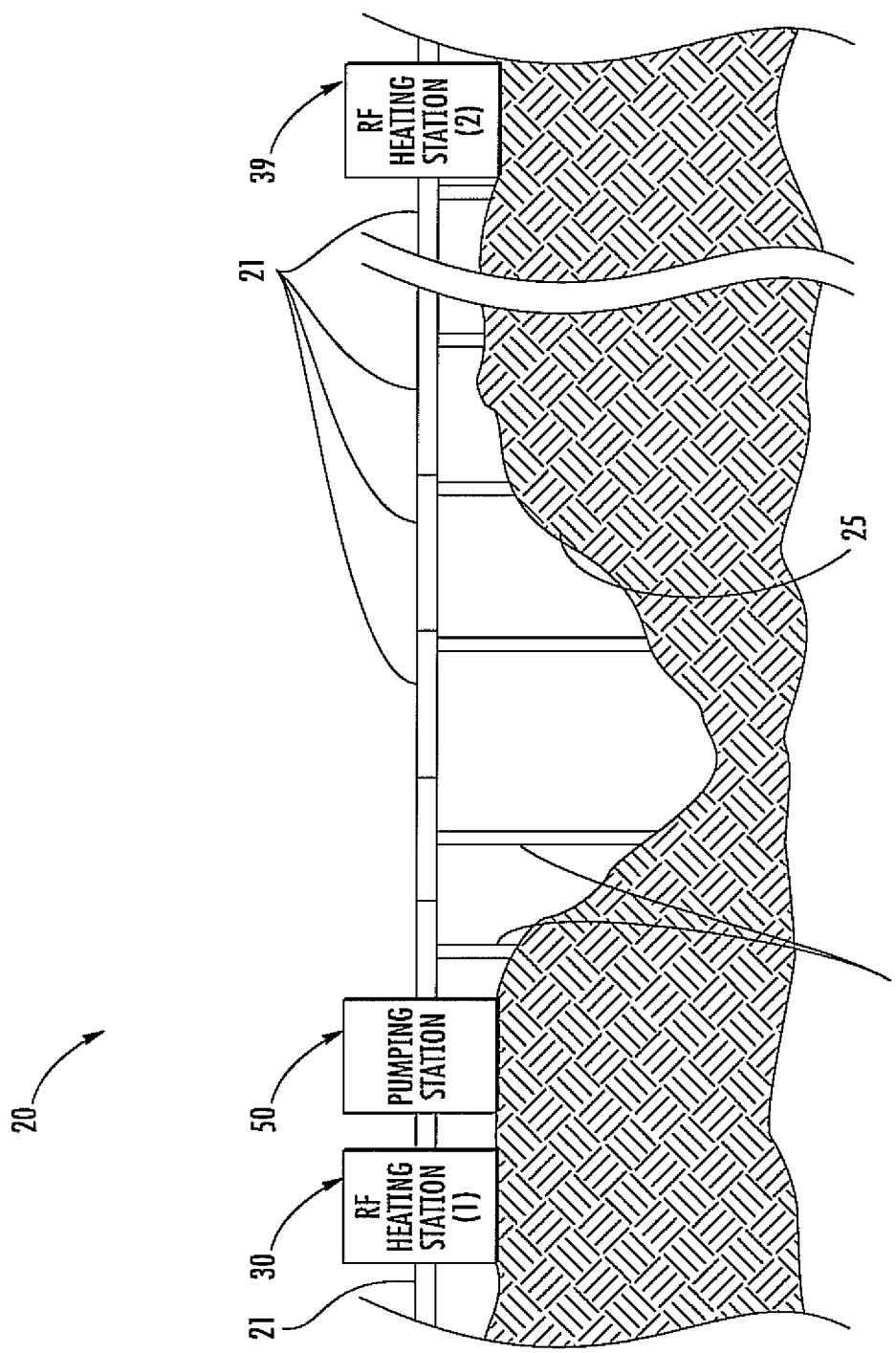
FIG. 1 is a schematic diagram of a hydrocarbon fluid pipeline according to the present invention.

Referring initially to FIG. 1, a hydrocarbon fluid pipeline 20 includes pipeline segments 21 coupled together in end-to-end relation between first and second spaced apart geographic locations. The pipeline segments 21 may include metal, for example, so that they are electrically conductive. The hydrocarbon fluid pipeline 20 may carry crude oil, gasoline, or other hydrocarbon fluid therethrough, for example. More particularly, the hydrocarbon fluid pipeline 20 may carry hydrocarbon fluid from a source or reservoir to a refinery or port, or other hydrocarbon processing facility, for example.

The hydrocarbon fluid pipeline 20 also includes spaced apart supports 24 positioning at least a portion of the pipeline segments 21 above ground level 25. The supports 24 may advantageously reduce exposure to ground or subterranean elements, and may allow for increased ease of inspection and repair of the pipeline segments. The supports 24 are illustratively in the form of a metallic support structure. The supports may be in the form of a bridge, for example. In some embodiments, the supports 24 may not be metallic, and/or the supports may be in the form of sliders, for example where the pipeline segments cross a fault line in the ground 25.

Figure 2:
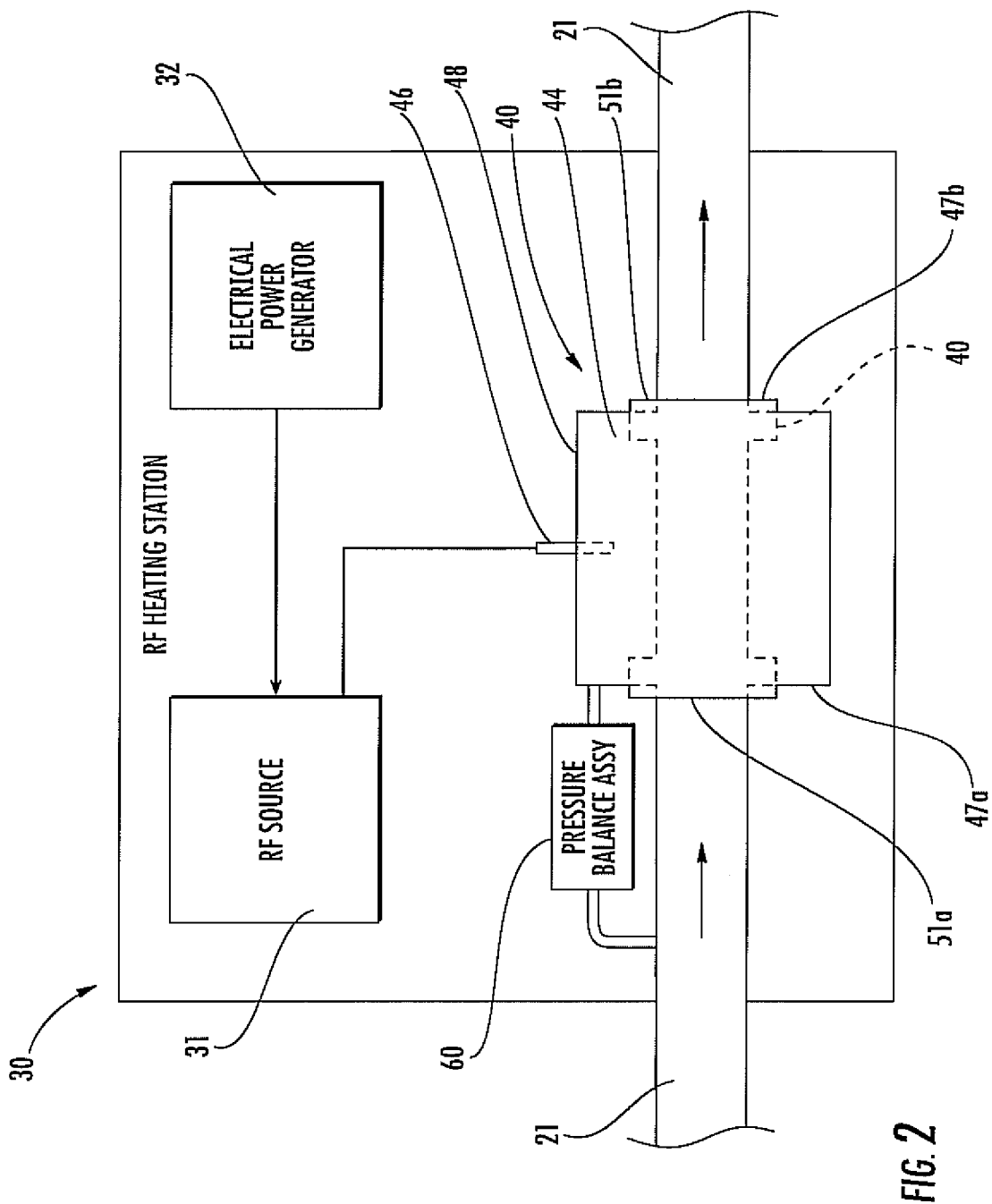
FIG. 2 is a schematic diagram of the RF heating station of FIG. 1.

Referring additionally to FIG. 2, the hydrocarbon fluid pipeline 20 also includes a radio frequency (RF) heating station 30 that includes an RF source 31. The RF heating station 30 also includes an electrical power generator 32 connected to the RF source 31, for generating power, as where there may be no electrical service. More than one RF heating station 39 may be included and may be geographically spaced apart from other RF heating stations (FIG. 1). Additionally, while the RF heating station 30 is illustratively above ground level 25, the RF heating station may be below ground level.

A hydrocarbon fluid pumping station 50 is connected to pipeline segments, and is adjacent the RF heating station 30. The hydrocarbon fluid pumping station 50 is configured to increase the pressure or flow of the hydrocarbon fluid as it travels along the hydrocarbon fluid pipeline segments 21. The hydrocarbon fluid pumping station 50 and the RF heating station 30 may be located within a same structure, for example, a refinery. More particularly, it may be advantageous for the RF source 31 and the pumping station to co-located.

Figure 3:
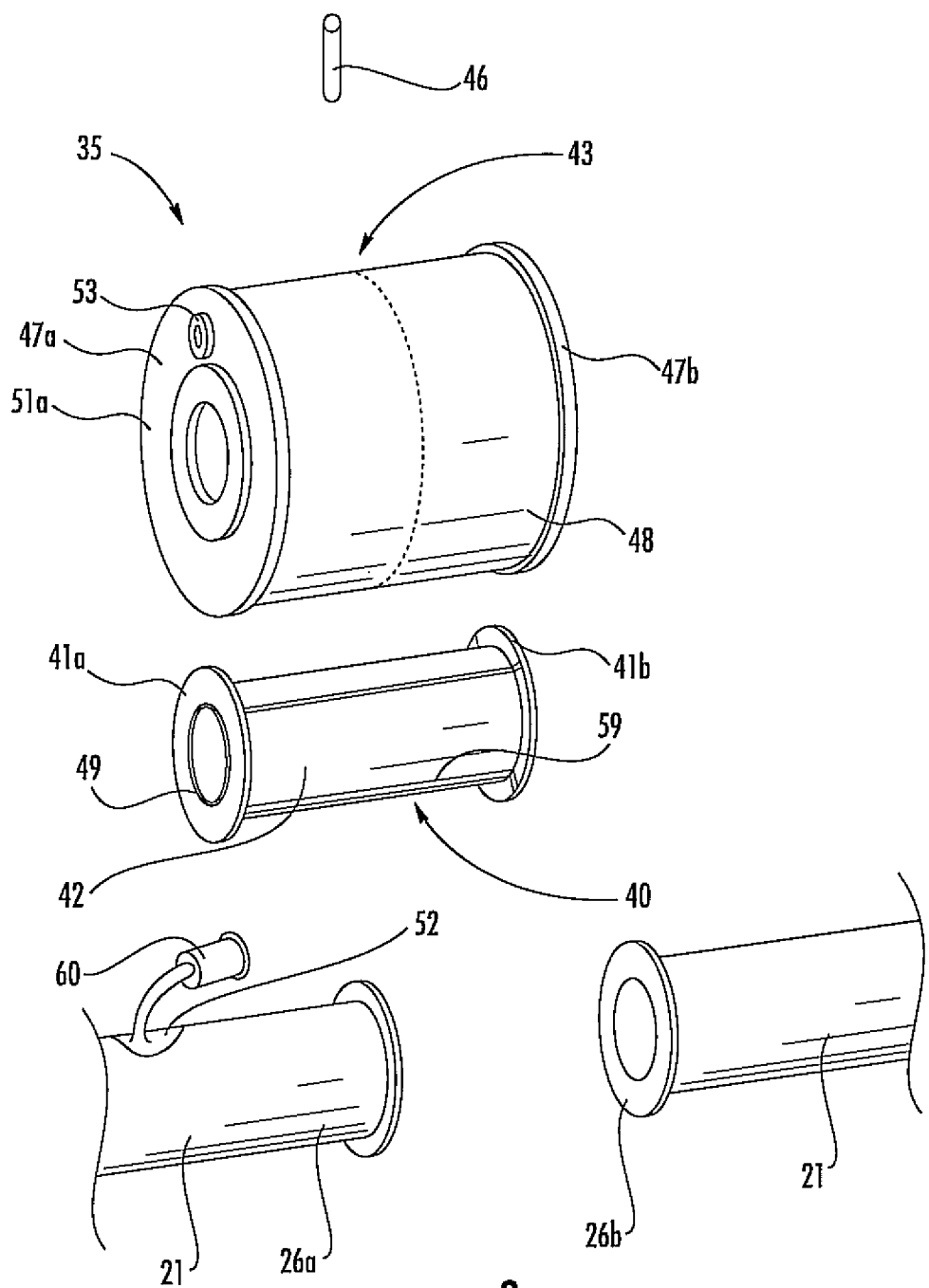
FIG. 3 is an exploded perspective view of the RF heater of FIG. 2.
Figure 4:
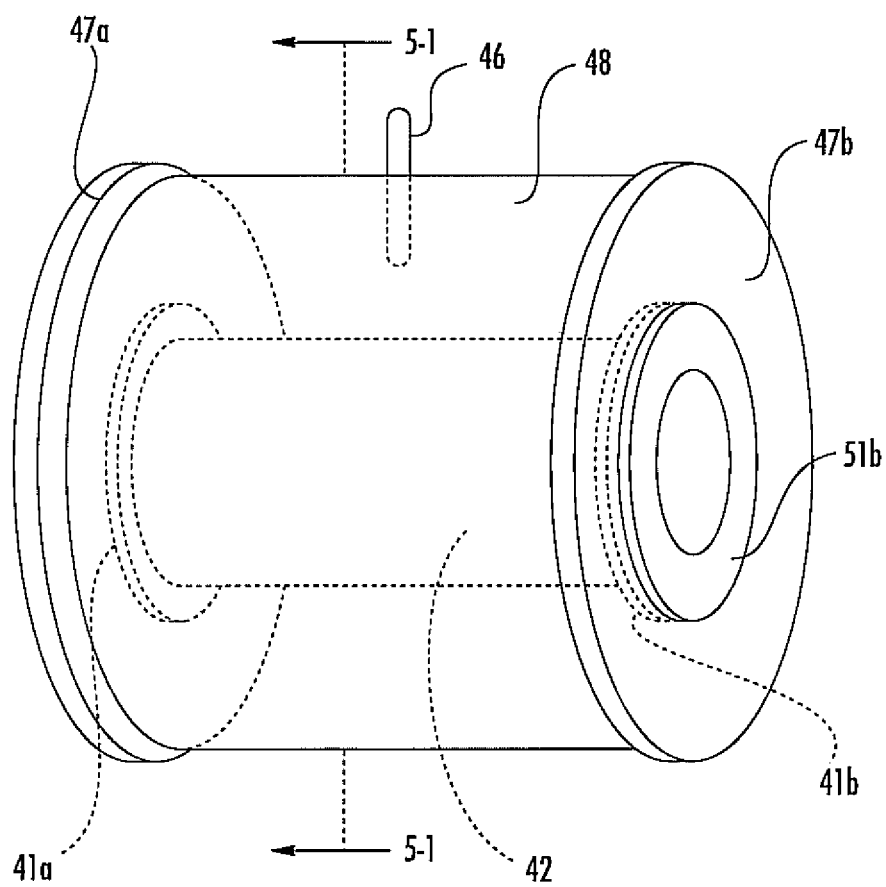
FIG. 4 is a perspective view of a portion of the RF heater of FIG. 2.
Figure 5:
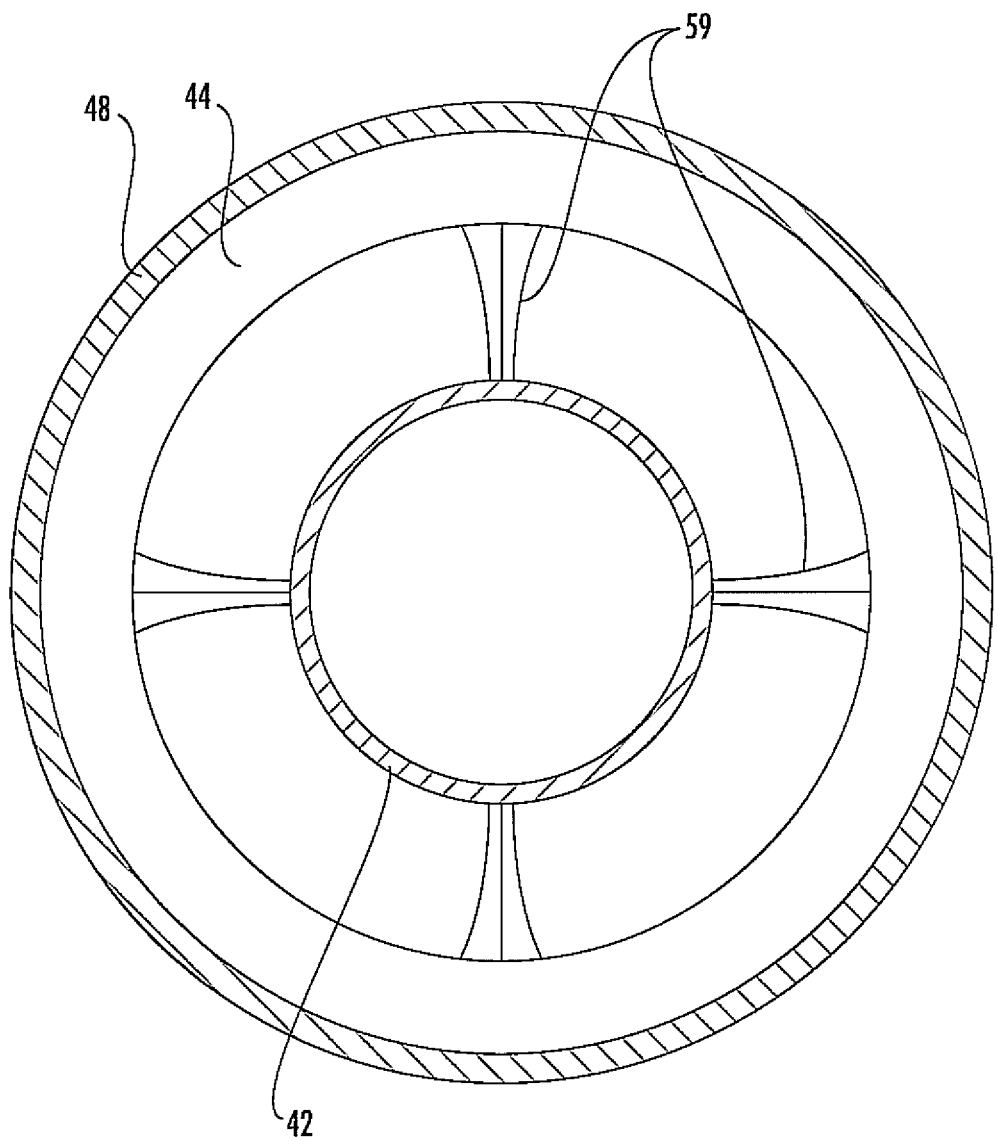
FIG. 5 is a cross-sectional view of the portion of the RF heater of FIG. 4 taken along line 5-1.

Referring now additionally to FIGS. 3-5, the hydrocarbon fluid pipeline 20 also includes an RF heater 35 between adjacent sections of the pipeline segments 21. The RF heater 35 is configured to heat hydrocarbon fluid flowing through the pipeline segments 21. The RF heater 35 includes an inner tubular dielectric coupler 40 between adjacent sections of the pipeline sections 21. The inner tubular dielectric coupler 40 may include a pair of end flanges 41a, 41b and a tubular body 42 extending therebetween. The end flanges 41a, 41b couple to respective end flanges 26a, 26b of the pipeline segments 21. The end flanges 41a, 41b of the inner tubular dielectric coupler 40 may include a surface feature 49 that aides in alignment with the pipeline segment 21 and may provide an increased seal when connected. Ribs 59 may extend along the length of the inner tubular dielectric coupler 40 for increased strength. The inner tubular dielectric coupler 40 has a same cross-sectional shape as the adjacent sections of the plurality pipeline segments. In other words, the inner diameters of the pipeline segments 21 and the inner tubular dielectric coupler 40 are the same size, for example 48-inches, so that obstruction of the hydrocarbon fluid flow is reduced.

The inner tubular dielectric coupler 40 may be high density polyethylene (HDPE). Of course, the inner tubular dielectric coupler 40 may be another dielectric material.

The RF heater 35 also includes an electrically conductive outer housing 43 surrounding the inner tubular dielectric coupler 40. Similar to the inner tubular dielectric coupler 40, the electrically conductive outer housing 43 includes a pair of spaced apart end walls 47a, 47b and a tubular body 48 extending therebetween. The electrically conductive outer housing 43 is cylindrical in shape to define an RF cavity 44. The electrically conductive outer housing 43 may also be a two-part housing, for example, it may come apart for increased ease of assembly. The spaced apart end walls 47a, 47b may each include a recess 51a, 51b, with respect to the RF cavity 44, for receiving the end flanges 26a, 26b of the pipeline segments 21 therein. Each recess 51a, 51b may aid in alignment with the pipeline segment 21. Of course, the end walls 47a, 47b may not include a recess, or may include other or additional surface features.

The RF heater 35 includes an RF feed 46 connected to the RF cavity 44 and the RF source 31. More particularly, the RF feed 46 extends into the RF cavity 44 a distance or length that is matched to the resonant frequency of the RF cavity. The resonant frequency of the RF cavity 44 is based upon the diameter of the electrically conductive outer housing 43. Accordingly, the RF source 31 is configured to apply RF power at a frequency based upon a resonant frequency of the RF cavity 44.

The RF source 31 may apply RF power which may be matched to the resonant frequency of the RF cavity 44. Of course, the RF source 31 may apply RF power at another frequency or frequency range. For example, for a flow rate less than 550,000 BPD, the RF source 31 may be configured to apply RF power in a range of 7-8 megawatts, for example, as 1.5 megawatts typically corresponds to a 1° F. temperature increase. It should be understood, however, that the size of the pipeline segments 21 and the RF cavity 44 may be independent of each other.

RF power is applied by the RF source 31 heating the hydrocarbon fluid within the pipeline segments 21. More particularly, the hydrocarbon fluid is heated volumetrically, i.e., throughout the cross-section. In other words, the RF heater 30 cooperates with the RF source 31 to mostly heat the hydrocarbon fluid and not so much of the outside of the pipeline segments 21. Indeed, the pipeline segments 21, which may include metal, block RF energy.

It may be particularly desirable for the RF heater 30 to be configured to supply a majority of the RF power to the hydrocarbon fluid, reducing the power absorbed by the RF cavity 44 so that wall temperatures, e.g. the tubular body 42 of the inner tubular dielectric coupler 40, may not be excessive.

The hydrocarbon fluid pipeline 20 may further include a pressure balance assembly 60 connected between an adjacent pipeline segment 21 and the electrically conductive outer housing 43. In particular, the pressure balance assembly may be coupled to an opening 52 in the adjacent pipeline segment 21 and an opening 53 in the electrically conductive outer housing 43. The pressure balance assembly 60 may be in the form of the pressure valve, for example, and may be particularly advantageous for pressure irregularities that may occur from pigging operations, for example. Pressure balancing of the cavity may allow for thinner dielectric wall section and less energy lost to the wall.

Indeed, the RF heating station 30 may advantageously be installed and operated relatively easily. More particularly, existing pipeline segments may be replaced with the hydrocarbon fluid pipeline 21 described herein including the RF heater 35. More than one RF heating station 30 including an RF heater 35 may be added to obtain a desired temperature profile along the length of the pipeline segments 21. The RF heating station 30 including the RF source 31 may also be controlled electronically. More particularly, in some embodiments, the RF heating station 30 may be monitored remotely, and the RF source 31 may also be controlled remotely. For example, depending on the type of hydrocarbon fluid carried within the pipeline segments 21, it may be desirable to change the frequency, or it may be desirable to turn off the RF source 31 when a pig passes.

Figure 6:
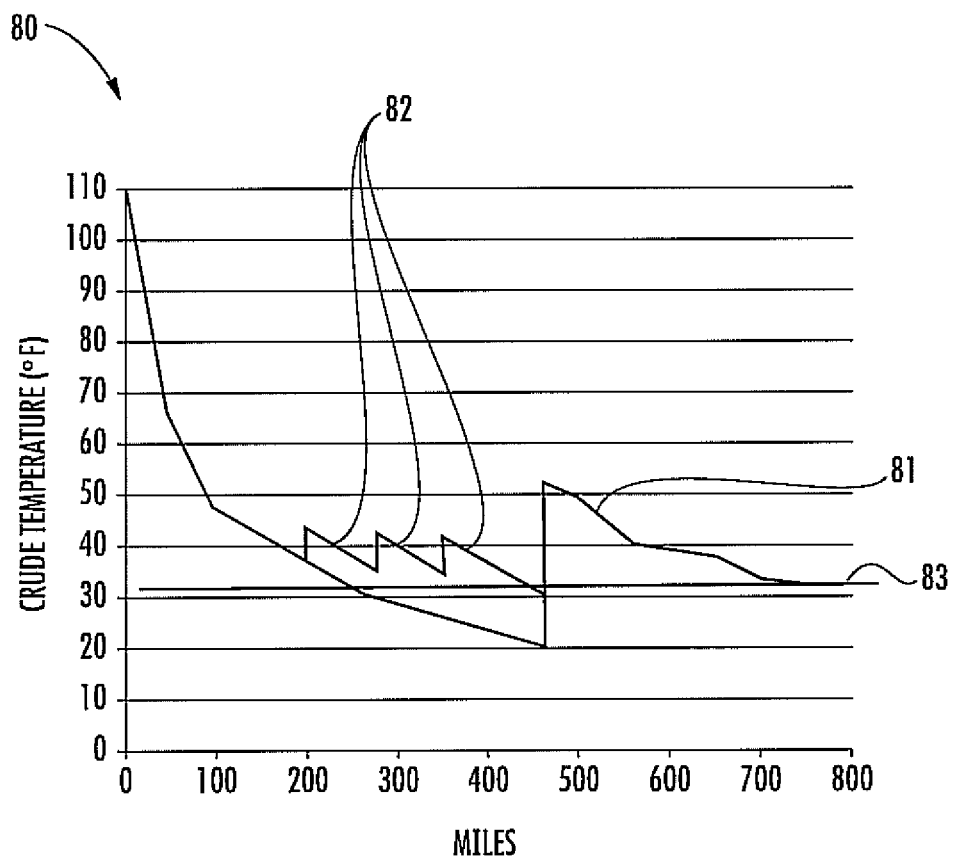
FIG. 6 is a graph of hydrocarbon fluid temperature including simulated exemplary hydrocarbon fluid temperatures from hydrocarbon fluid heating using the hydrocarbon fluid pipeline according to the present invention.

Referring now to the graph 80 in FIG. 6, the temperature of crude oil 81 passing through the Trans Alaska Pipeline System, for example, at a rate of 400,000 BPD at different mileages along the pipeline is illustrated. Illustratively, the temperature falls below 32° F. at about mile 275 and remains there until about mile 450, where the crude oil is heated by a refinery. The hydrocarbon fluid pipeline 21 would advantageously maintain crude oil temperatures above 32° F. 83 as illustrated by line 82. Three RF heating stations are added between miles 200 and about 350, each adding 7° F. to the crude oil. Additional RF heating stations may be added as desired after the crude oil leaves the refinery. Accordingly, smaller temperature deltas may be desirable, as the smaller temperature deltas result in less energy usage. While the example of the Trans Alaska Pipeline System is used, it will be appreciated that the RF heating stations may be used with other pipelines, which may vary in size and shape, for example.

A method aspect is directed to a method of heating hydrocarbon fluid flowing through a hydrocarbon fluid pipeline 20 including a plurality of pipeline segments 21 coupled together between first and second spaced apart geographic locations. The method includes positioning an RF heater 35 between adjacent pipeline segments 21. The RF heater 35 includes an inner tubular dielectric coupler 40 between adjacent pipeline segments 21, and an electrically conductive outer housing 43 surrounding the inner tubular dielectric coupler 40. The method also includes supplying RF power to the RF heater 35 via the outer housing 43 to heat the hydrocarbon fluid flowing through the hydrocarbon pipeline 20.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A hydrocarbon fluid pipeline comprising:
   a plurality of pipeline segments connected together in end-to-end relation between first and second spaced apart geographic locations and configured to carry hydrocarbon fluid therethrough;
   a radio frequency (RF) heating station comprising
      an RF source, and
      an RF heater between adjacent pipeline segments of said plurality thereof and comprising
         an inner tubular dielectric coupler between the adjacent pipeline segments, and
         an electrically conductive outer housing surrounding said inner tubular dielectric coupler and connected to said RF source to heat the hydrocarbon fluid; and
   a pressure balance assembly connected between one of the adjacent pipeline segments and said electrically conductive outer housing.

2. The hydrocarbon fluid pipeline of claim 1, wherein said electrically conductive outer housing defines an RF cavity; and wherein said RF heater further comprises an RF feed connected to the RF cavity.

3. The hydrocarbon fluid pipeline of claim 2, wherein said RF source is configured to apply RF power at a frequency based upon a resonant frequency of the RF cavity.

4. The hydrocarbon fluid pipeline of claim 1, wherein said inner tubular dielectric coupler has a same cross-sectional shape as the adjacent pipeline segments.

5. The hydrocarbon fluid pipeline of claim 1, wherein said electrically conductive outer housing comprises a pair of spaced apart end walls and a tubular body extending therebetween.

6. The hydrocarbon fluid pipeline of claim 1, wherein said inner tubular dielectric coupler comprises a pair of end flanges and a tubular body extending therebetween.

7. The hydrocarbon fluid pipeline of claim 1, wherein said inner tubular dielectric coupler comprises high density polyethylene (HDPE).

8. The hydrocarbon fluid pipeline of claim 1, wherein said RF heating station further comprises an electrical power generator connected to said RF source.

9. The hydrocarbon fluid pipeline of claim 1, further comprising a hydrocarbon fluid pumping station connected to said plurality pipeline segments, and adjacent said RF heating station.

10. The hydrocarbon fluid pipeline of claim 1, further comprising a plurality of spaced apart supports positioning at least a portion of said plurality of pipeline segments above ground level.

* * * * *